(12) United States Patent
Speirs, III et al.

(10) Patent No.: US 7,748,036 B2
(45) Date of Patent: Jun. 29, 2010

(54) METHODS FOR CATEGORIZING INPUT DATA

(75) Inventors: William R. Speirs, III, West Laff, IN (US); Eric B. Cole, Leesburg, PA (US)

(73) Assignee: Sytex, Inc., Doylestown, PA (US)

( * ) Notice: Subject to any disclaimer, the term of this patent is extended or adjusted under 35 U.S.C. 154(b) by 902 days.

(21) Appl. No.: 11/288,983

(22) Filed: Nov. 28, 2005

(65) Prior Publication Data

US 2007/0116267 A1   May 24, 2007

Related U.S. Application Data

(63) Continuation-in-part of application No. 10/405,996, filed on Apr. 1, 2003.

(51) Int. Cl.
*G06F 11/263* (2006.01)
*H04K 1/00* (2006.01)
*H04L 9/00* (2006.01)
*G06F 12/16* (2006.01)

(52) U.S. Cl. .......................................... 726/22; 380/28

(58) Field of Classification Search ................... 380/28; 726/22
See application file for complete search history.

(56) References Cited

U.S. PATENT DOCUMENTS

2002/0129140 A1 *   9/2002   Peled et al. .................. 709/224

OTHER PUBLICATIONS

Unknown author. "Random Number Generation", 1999.*
Weber, Michael et al. "A Toolkit for Detecting and Analyzing Malicious Software", 2002 IEEE.*
Kirby, Andrew. "Problem: Devising a General Approach for the Detection of Encrypted Files or Packets", Mar. 2002.*
Menezes, Alfred J. et al. Handbook of Applied Cryptography, 1997 CRC Press, pp. 169-190.*
Schneier, Bruce. Applied Cryptography, Second Edition, 1996 John Wiley & Sons, Inc., pp. 226-227.*

* cited by examiner

*Primary Examiner*—Michael J Simitoski
(74) *Attorney, Agent, or Firm*—Buchanan Ingersoll & Rooney PC

(57) ABSTRACT

Methods are provided for categorizing input data into a selected data type category. Exemplary embodiments are directed to the categorization of binary input data, for example random input data, as either compressed or encrypted based on statistical analysis. To this end, at least a portion of the input data is analyzed to derive a statistical test result for the portion that is indicative of a degree of randomness of the data. The data is then categorized as either compressed or encrypted based on the statistical test result.

25 Claims, 13 Drawing Sheets

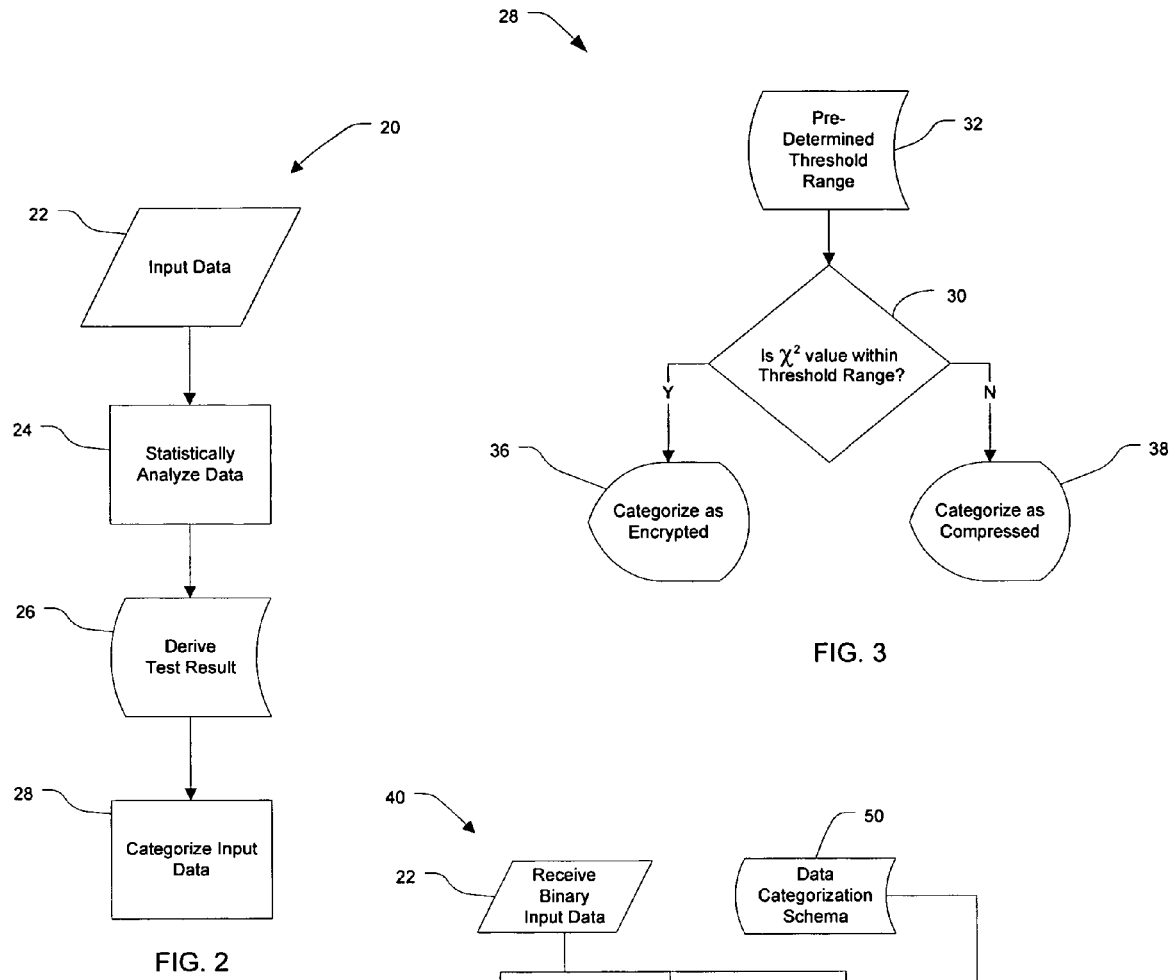
FIG. 2
FIG. 3
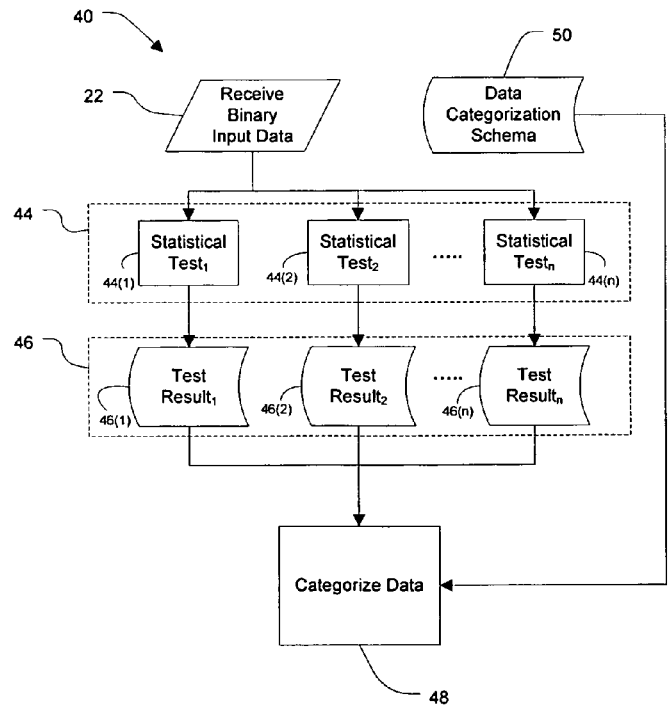
FIG. 4

METHODS FOR CATEGORIZING INPUT DATA

BACKGROUND

Modern society has come to rely quite heavily on electronic communication and computerized data storage and processing. Because of the volume and sensitivity of the data stored and communicated via electronic devices, users have sought to protect their communications and sensitive data from others who may wish to compromise this information either by physically accessing a computer or by intercepting wired or wireless network communications. One well-known method by which users protect their data and communications is through the use of encryption. Ideally, encryption should be used for legitimate purposes such as protecting sensitive data and private communications. However, there are an untold many who employ encryption to obfuscate their nefarious activities, such as the infiltration of a network infrastructure, to hide incriminating data, and to hide communications involving criminal activity, to name a few examples.

Because encryption is a well-known method of protecting or obfuscating communications and data, law enforcement and cryptanalysts know to look for encrypted data (also referred to as ciphertext) as an indicator of possibly useful information for thwarting attacks or investigating attacks that have already occurred. For these reasons and others it is useful to have an efficient method to detect and distinguish encrypted data from other types of data.

One simplified approach for distinguishing encrypted files from other file types is to read file headers, or in the case of network traffic, packet headers. For example, in regards to digital forensics, it is not uncommon for subjects to alter file extensions or even header information in hopes that particular data will be overlooked during a hard disk drive analysis. Unencrypted files will have discernible headers, which reveal their structure, whereas encrypted files will have indiscernible headers.

Unfortunately, in many cases the rudimentary analysis of merely looking at file headers does not prove fruitful because it is possible to obfuscate a file's content by changing the header information and/or the packet signature information. Thus, for example, an encrypted file could be manipulated to incorporate plaintext header information to indicate file data of a different type. While a naïve analyst might be deceived by such manipulation, a trained analyst would know to delve deeper. Moreover, in the case of a noisy network or with surveillance data, only portions of the data may be captured and therefore the header information might not be available for inspection.

Where the file headers do not exist, there is another known approach that may be used to particularly distinguish between encrypted and compressed files. This approach entails running a compression algorithm against the data. Encrypted data usually will compress to some degree, whereas use of an appropriate compression algorithm on already compressed data will usually cause the data to grow in size. Thus, this property of increasing file size upon compression can be used to distinguish between the two file types.

While this approach can prove quite useful, its primary limitation is that it relies on knowledge of the underlying compression algorithm that was used to generate the compressed data in the first place. Unless the same compression algorithm is used in the testing, the results can be indeterminate. Unfortunately, the underlying compression algorithm is often not known which can translate into a time consuming analysis and may frustrate investigative efforts. There accordingly remains a general need for a more robust approach for distinguishing between encrypted data and other data types, regardless whether the data of interest is part of a file or a data stream, and more particularly an approach which is capable of distinguishing between encrypted data and compressed data.

The foregoing examples of the related art and their related limitations are intended to be illustrative and not exclusive. Other limitations may become apparent to those practiced in the art upon a reading of the specification and a study of the drawings.

SUMMARY

The following embodiments and aspects thereof are described and illustrated in conjunction with methods that are meant to be exemplary and illustrative, not limiting in scope. In various embodiments, one or more of the above-described problems have been reduced or eliminated, while other embodiments are directed to other improvements.

Methods are provided for categorizing input data into a selected data type category. Exemplary embodiments are directed to the categorization of binary input data, for example random input data, as either compressed or encrypted based on statistical analysis. To this end, at least a portion of the input data is analyzed to derive a statistical test result for the portion that is indicative of a degree of randomness of the data. The data is then categorized as either compressed or encrypted based on the statistical test result. In the preferred embodiments, a plurality of statistical tests are conducted against the data. These tests preferably include all, or a combination of, the following: the frequency test, the serial (two-byte) test, the poker test, the runs test, the autocorrelation test, and Mauer's universal statistical test, a monotonically increasing test and/or a monotonically decreasing test.

Each of these statistical tests analyzes one or more distinct characteristics of data to derive an associated statistical test result, namely $\chi^2$, which indicates the goodness of fit to a theoretical distribution of random data. A small $\chi^2$ indicates a high degree of randomness for the input data. A threshold range is established for each statistical test so that an actual $\chi^2$ value obtained when the input data is subjected to a given test can give insight into the data type category for which the input data can be categorized. Various data type categories are contemplated. For example, an actual $\chi^2$ test result might indicate generally whether the input data is random or plaintext. In the preferred embodiments the result is used to more particularly ascertain whether the input data is compressed or encrypted, although this should not be construed as limiting. Also in the exemplary embodiments, the input data may be either a data file or a contiguous data stream. For data files, it is preferred to remove the file header and conduct the various statistical tests only on the data portion of a file. The same holds true for a contiguous stream of input data if the demarcation between file headers and data portions can be ascertained.

Categorization of the input data as either compressed or encrypted can be accomplished in a variety of manners based on a categorization schema. For instance, one straightforward approach is to categorize the input data as compressed if a majority of the statistical tests indicate data compression; otherwise, the data is categorized as encrypted. Another categorization schema involves assigning weighted values to each statistical test to produce a weighted sum corresponding to an overall statistical test result. The data is then categorized as either compressed or encrypted based on whether the weighted sum falls within or outside a selected threshold range. In this regard, the weighting value assigned to each test result may be determined by an optimization algorithm, such as a genetic algorithm, fuzzy logic or numerical methods, to name a few.

In addition to the exemplary aspects and embodiments discussed above, further aspects and embodiments will become apparent by study of the following descriptions and by reference to the drawings, in which:

BRIEF DESCRIPTION OF THE DRAWINGS

Exemplary embodiments are illustrated in the referenced figures of the drawings. It is intended that the embodiments and figures disclosed herein be considered illustrative rather than limiting. In the figures:

FIG. 2 represents a high level flowchart for computer software which implements the functions of the various data categorization methods;

FIG. 3 illustrates one approach for categorizing data which involves a single statistical test;

FIG. 4 is a flowchart for a generalized data categorization method involving a plurality of statistical tests;

DETAILED DESCRIPTION

Figure 1:
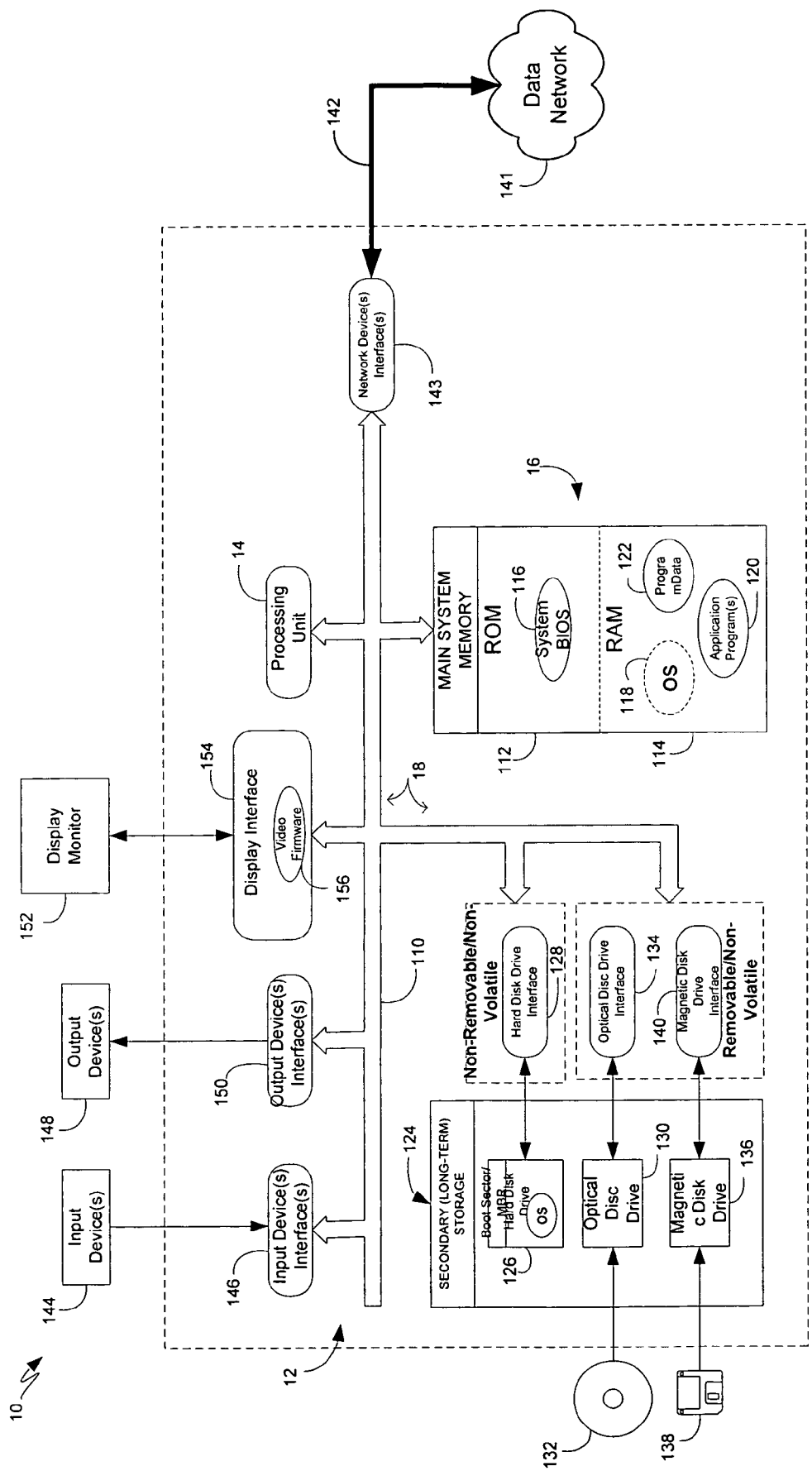
FIG. 1 illustrates a diagram of a representative general-purpose computer system that may be configured to implement aspects of the described embodiments.

At first glance it might seem the goal behind a compression algorithm and the goal behind an encryption algorithm are diametrically opposed. One is trying to compress data so that it can be easily uncompressed, and the other is trying to obfuscate the data so that it cannot be understood. However, it is the method used to achieve these goals that is very similar, and makes them difficult to differentiate. In both cases the algorithms are leveraging patterns found in the data. Compression algorithms work by locating these patterns and then simplifying them to a single part of the pattern and then recording where and how often they repeat. Encryption on the other hand, tries to remove these patterns from the data creating a uniform distribution of data. With both compression and encryption the end result is a set of data where the patterns have been removed. This lack of patterns leads to some degree of randomness. In the case of encryption the goal is to create seemingly random data from a normal file. In the case of compression the goal is simply to compress the data thereby removing all patterns. Provided herein is a method that leverages this small difference between removing repeating patterns and eliminating all patterns in order to distinguish between encrypted and compressed data.

Despite the various past attempts for distinguishing encrypted files from other file types, it is believed that a more robust approach for determining whether data is encrypted relies on the degree to which the data is random. Simply put, when a file or data is encrypted, the encryption software manipulates the data to make it appear almost completely random. By comparing the degrees of randomness of data under scrutiny with other data the encrypted data will generally stand out. However, one type of data against which encrypted data will not stand out is compressed data. Thus, there is also a need for a method of distinguishing between encrypted and compressed data.

In the following detailed description, reference is made to the accompanying drawings, which form a part hereof, and in which is shown by way of illustrations certain exemplary embodiments. The leading digit(s) of the reference numbers in the figures usually correlate to the figure number; one notable exception is that identical components that appear in multiple figures are identified by the same reference numbers. The embodiments illustrated by the figures are described in sufficient detail to enable those skilled in the art to practice the invention, and it is to be understood that other embodiments may be utilized and changes may be made without departing from the spirit and scope of the present invention. The following detailed description is, therefore, not to be taken in a limiting sense, and the scope of the present invention is defined by the appended claims.

Various terms are used throughout the description and the claims, which should have conventional meanings to those with a pertinent understanding of encryption and compression technologies. Also, while the description to follow may entail terminology which is perhaps tailored to certain computing or programming environments, the ordinarily skilled artisan will appreciate that such terminology is employed in a descriptive sense and not a limiting sense. Where a confined meaning of a term is intended, it will be explicitly set forth or otherwise apparent from the disclosure.

Before describing the invention in detail, embodiments of a representative computing environment for use in implementing aspects of the invention will be described with reference to FIG. 1 Representative computing environment 10 may utilize a general purpose computer system 12 for executing applications in accordance with the described teachings. Computer system 12 may be adapted to execute in any of the well-known operating system environments, such as Windows, UNIX, MAC-OS, OS2, PC-DOS, DOS, etc. In the described embodiments an 80×86 architecture was employed running a Linux operating system. System 12 includes a processing unit 14 (e.g., a CPU) for executing instructions, a system memory 16 for storing programs and data currently in use by the system, and an input output (I/O) system, generally 18. These various components are interconnected by a system bus 110 which may be any of a variety of bus architectures. System memory 16 may include both non-volatile read only memory (ROM) 112 and volatile memory such as static or dynamic random access memory (RAM) 114. Programmable read only memories (PROMs), erasable programmable read only memories (EPROMs) or electrically erasable programmable read only memories (EEPROMs) may be provided. ROM portion 112 stores a basic input/output system (the system BIOS). RAM portion 114 stores an operating system (OS) 118, one or more application programs 120 (e.g., programming to accomplish the compression, encryption and data categorization capabilities described herein), as well as program data 122 (e.g., the statistical results, the threshold ranges, etc.).

Various types of storage devices can be provided as more permanent data storage areas for the application programs and other data. These can be either read from or written to such as contemplated by secondary (long term) storage 124. Suitable devices may, for example, include a non-removable, non-volatile storage device in the form of a large-capacity hard disk drive 126 which is connected to the system bus 110 by a hard disk drive interface 128 such as ATA (IDE, EIDE), SCSI, FireWire/IEEE 1394, USB, or Fibre Channel. Hard disk drive 126 generally includes at least one bootable disk that stores the OS that is loaded into RAM 114 during a booting sequence, although the OS can alternatively be stored on removable media.

An optical disk drive 130 for use with a removable optical disk 132 such as a CD-ROM, DVD-ROM or other optical media, may also be provided and interfaced to system bus 110 by an associated optical disk drive interface 134. Computer system 12 may also have one or more magnetic disk drives 136 for receiving removable storage, such as a floppy disk or other magnetic media 138, which itself is connected to system bus 110 via magnetic disk drive interface 140. Remote storage over a network is also contemplated.

One or more of the memory or storage regions mentioned above may comprise suitable media for storing programming code, data structures, computer-readable instructions or other data types for the computer system 12. Such information is then utilized by processor 14 so that the computer system 12 can be configured to embody the capabilities described herein.

System 12 may be adapted to communicate with a data distribution network 141 (e.g., LAN, WAN, the Internet, etc.) via communication link(s) 142 so that, for instance, it can communicate with remote servers, clients, etc. Establishing network communications is aided by one or more network device interface(s) 143, such as a network interface card (NIC), a modem or the like suitably connected to the system bus 110. These can serve as a common interface for various other devices within a LAN and/or as an interface to allow networked computers to connect to external networks. System 12 preferably also operates with various input and output devices as part of I/O system 18. For example, user commands or other input data may be provided by any of a variety of known types of input devices 144 (e.g. keyboard, pointing device, game controller, power pad, digital camera, image scanner, modem, network card, touch screen, microphone) having associated input interface(s), generally 146. One or more output devices 148 (e.g. monitor or other suitable display device, printer, fax, recording device, plotter) with associated interfaces, generally 150, may also be provided. For instance, a display monitor 152 may be connected to the system bus 110 by a suitable display adapter 154 (i.e., video card) having associated video firmware 156.

Although certain aspects for a user's computer system may be preferred in the illustrative embodiments, the present invention should not be unduly limited as to the type of computers on which it can be implemented, and it should be readily understood that the present invention indeed contemplates use in conjunction with any appropriate information processing device (IPD) having the capability of being configured in a manner for accommodating the invention. Moreover, it should be recognized that the invention could be adapted for use on computers other than general-purpose computers (e.g. embedded computers), as well as general-purpose computers without conventional operating systems.

Software embodying the present invention may be distributed in known manners, such as on computer-readable medium that contains the executable instructions for performing the methodologies discussed herein. Alternatively, the software may be distributed over an appropriate communications interface so that it can be installed on the user's computer system. Furthermore, alternate embodiments which implement the invention in hardware, firmware or a combination of both hardware and firmware, as well as distributing the modules and/or the data in a different fashion will be apparent to those skilled in the art. It should, thus, be understood that the description to follow is intended to be illustrative and not restrictive, and that many other embodiments will be apparent to those of skill in the art upon reviewing the description.

In FIG. 2, a high level flowchart is shown for computer software that implements the functions of the input data categorization system of the present invention. It should be appreciated that FIG. 2 illustrates the broad aspects of the computerized methodology as it relates to a selected computer system environment. These broad aspects, however, could be readily adapted for other computer system environments, or updated as a given computer system environment changes over time.

According to data categorization method 20 in FIG. 2, input data 22 is statistically analyzed at 24 to derive an overall test result at 26 that can be used to categorize the type of input data at 28. The input data 22 may be generated from a variety of sources (e.g., audio or video recordings, network traffic, image files, or the like) and may be in a fixed format, such as a data file, or a contiguous data stream. Moreover, input data 22 can be in plaintext form, encrypted, compressed, or uncompressed. Regardless, the input data 22 may be represented as a series of bits that can each be analyzed to derive an overall statistical test result.

Preferably, the statistical analysis 24 of the data produces a test result 26 that indicates the level of randomness of the data 22 under scrutiny. More particularly, the test result 26 is a $\chi^2$ value relating to the input data's degree of randomness. In preferred embodiments, the teachings described herein are applied to ascertain if random input data is compressed or encrypted based on the data's randomness characteristics. For purposes of the description, random input data is that which is characterized by a plurality of bits having few, if any, detectable patterns or redundancies. Typically, such random digitized data is that which has been previously compressed or encrypted so that it does not exhibit the patterns and redundancies typically found in non-random data. Where random data is used as the input the term "random" is intended to be construed in the broadest possible sense to encompass data derived from truly random sources in the natural environment, such as physical phenomena at the quantum level, or data derived from pseudo-random sources such as compressed files, encrypted files, digitized video or voice data, image files and the like, without limitation.

In its simplest form, as represented in FIG. 3, it is contemplated that categorization of the input data 28 could be accomplished using as single statistical test to analyze at least a portion of the input data. That is, a selected statistical test could be conducted against a sufficient sampling of the input data to derive a $\chi^2$ test result which is indicative of a degree of randomness for the data. This $\chi^2$ test result is then compared at 30 with a pre-determined threshold range 32, such that the input data 22 is categorized as encrypted 36 if the test result is within the pre-determined threshold range 32; otherwise the input data is categorized at 38 as compressed (i.e., $\chi^2$ test result 26 is outside the pre-determined threshold range 32).

In the above embodiment it should be understood that the statistical test result 26 could be obtained from any of a plurality of suitable statistical tests. In preferred embodiments described below, a plurality of statistical tests are employed. To these ends, the statistical test(s) are preferably selected from the frequency test, the serial (two-byte) test, the poker test, the runs test, the autocorrelation test, Maurer's universal statistical test, a monotonically increasing test, and a monotonically decreasing test. Each statistical test performed on the data results in an associated $\chi^2$ value. This value is a goodness of fit value in that it indicates the level of confidence at which one can say that the data tested fits the data expected—in this case, random data. Each of the statistical tests is summarized below. The frequency test, the serial (two-byte) test, the poker test, the runs test, the autocorrelation test and Maurer's universal test are described in greater detail in Section 5 of Menezes, van Oorschot, and Vanstone, "Handbook of Applied Cryptography", CRC Press, 1996, which is incorporated by reference.

1. Statistical Tests a. Frequency Test

The frequency test counts the number of 0s and the number of 1s in a data sequence. For a truly random set of data, one would expect to find approximately the same number of 0s as 1s. Letting $n_0$, $n_1$ be the number of 0s and 1s, respectively, the equation for this test that approximately follows a $\chi^2$ distribution with 1 degrees of freedom if $n \geq 10$ is:

$$\chi^2 = \frac{(n_0 - n_1)^2}{n}$$

b. Serial (Two-bit) Test

The serial test is much like the frequency test however it accounts for two bits at a time, not just a single bit. Again, for truly random data one would expect to find approximately the same number of two bit occurrences. Letting $n_0$, $n_1$ be the number of 0s and 1s respectively, and $n_{00}$, $n_{01}$, $n_{10}$, and $n_{11}$ be the number of 00s, 01s, 10s, 11s, respectively, the equation for this test that approximately follows a $\chi^2$ distribution with 2 degrees of freedom if $n \geq 21$ is:

$$\chi^2 = \frac{4}{n-1}(n_{00}^2 + n_{01}^2 + n_{10}^2 + n_{11}^2) - \frac{2}{n}(n_0^2 + n_1^2) + 1$$

c. Poker Test

The poker test divides the sequence into k non-overlapping blocks of size m, such that $[n/m] \geq 5(2^m)$. For truly random data one would expect that each m length block would appear in the sequence approximately the same number of times. Letting $n_i$ be the number of occurrences of the $i^{th}$ block of size m, the equation for this test that approximately follows a $\chi^2$ distribution with $2^m - 1$ degrees of freedom is:

$$\chi^2 = \frac{2^m}{k}\left(\sum_{i=1}^{2^m} n_i^2\right) - k$$

d. Runs Test

The runs test determines if the number of various length consecutive 0s or 1s is approximately the same as is expected for truly random data. The expected number of gaps (consecutive 0s) or blocks (consecutive 1s) of length i is $e_i = (n-i+3)/2^{i+2}$. Letting k be equal to the largest integer i for which $e_i \geq 5$, and $B_i$ and $G_i$ be the number of blocks and gaps in the data, respectively, for each i where $1 \leq i \leq k$; then the equation for this test that approximately follows $\chi^2$ distribution with $2k-2$ degrees of freedom is:

$$\chi^2 = \sum_{i=1}^{k} \frac{(B_i - c_i)^2}{c_i} + \sum_{i=1}^{k} \frac{(G_i - c_i)^2}{c_i}$$

e. Autocorrelation Test

The autocorrelation test determines the number of bits that are the same after a d-bit non-cyclic shift, where d is a fixed integer, $1 \leq d \leq [n/2]$. The number of bits in the data that is not equal to their d-bit shift is:

$$A(d) = \sum_{i=0}^{n-d-1} s_i \otimes s_{i+d}$$

where $\otimes$ is the XOR operation. Then, the equation for this test that approximately follows a N (0,1) distribution if $n-d \geq 10$ is:

$$X = \frac{2\left(A(d) - \frac{n-d}{2}\right)}{\sqrt{(n-d)}}$$

Since small values of A(d) are as unexpected as large values, it is preferred to use a two-sided test.

f. Maurer's Universal Test

This test performs a calculation for a theoretical compression of the data. The algorithm does not actually perform the compression but rather calculates a statistic based on how well the data would compress if such an algorithm were run. It is well known that compressed data cannot usually be compressed further. However, since encryption is supposed to create seemingly random data, that data should also not be able to be compressed further either. A parameter L is chosen from the interval such that the data is broken into L-bit non-overlapping blocks. The total number of blocks is Q+K where Q is chosen to be at least $10*2^L$ and K is the remaining blocks used to determine the statistic. A table T is maintained such that, at each stage T[j], is the position of the last occurrence of the block corresponding to the integer j, $0 \leq j \leq 2^L - 1$. The first Q blocks of the data are used to initialize table T. For each i, $Q+1 \leq i \leq Q+K$ let $A_i = I - T[b_i]$. $A_i$ is the number of positions since the last occurrence of block $b_i$. This recording of distance between common blocks is very similar to the method used by the DEFLATE algorithm discussed below. The formula for the statistic is:

$$X_u = \frac{1}{K} \sum_{i=Q+1}^{Q+K} lgA_i$$

K should be at least $1000*2^L$ and the sample sequence then at least $1010*2^L*L$ bits in length.

g. Monotonically Increasing and Decreasing Tests

The concept behind these tests is that the data is broken up in to four byte words and these words are then treated as integers. For each word $w_i$ in the data, if $w_i < w_{i+1}$ then a counter, c, is incremented until $w_i \geq w_{i+1}$. Then $l_c$ is incremented so that a count of each length of increasing words is recorded. The end result is a histogram for number of words that appear in increasing order. The test works the same for monotonically decreasing except the counter, c, is incremented when $w_i > w_{i+1}$. The calculation for this test is shown in the following three equations:

$$C = \sum_{i \in 1 \ldots MAX(c) | l_i \neq 0} \left(\frac{l_i}{l_{i+1}}\right)$$

$$D = \sum_{i \in 1 \ldots MAX(c) | l_i \neq 0} (i - i + 1)$$

$$X_m = \left|\frac{C}{n-1} - \frac{1}{2}\right| + \left|\frac{D}{n-1} - 1\right|$$

The first equation above calculates the number of monotonic sequences for each length. For a random sequence there should be half as many sequences of length 1 as there are of length 2, and so on. This is why in the third equation, ½ is subtracted from the result. A set of data is considered more random the closer this statistic is to zero. The second equation above calculates the distance between sequences. For a random sequence there should not be gaps in lengths of the monotonic sequences. This is why in the third equation, 1 is subtracted from the result.

To illustrate the monotonic test, assume the following sequence of bits:

0011 0100 0001 0100 1001 0101 0100

Converting these into numbers by looking at 4 bit quantities results in the following:

3 4 1 4 9 5 4

Next, the length of increasing numbers is counted. The first two numbers increase, representing a length of 2. The next 3 numbers increase, representing a length of 3. Finally, the length of decreasing numbers is counted. In this example, that would be a run of 2 (for 4 1), and a run of 3 (for 9 5 4). The resulting values for C & D are as follows:

$C = \frac{1}{1}$  $D = \frac{1}{1}$

This is a very short example for illustration only and there is only 1 increasing run of length 2, for example. If there were 3 increasing runs of length 2, then C would become:

$C = \frac{3}{1}$

With an appreciation of the above tests, a generalized methodology 40 for distinguishing between data types using a plurality of statistical tests may now be appreciated with reference to FIG. 4. Binary input data 22 is received for testing as before. plurality of statistical tests 44(1) through 44(n) are performed on the input data. Tests 44(1) through 44(n) are any suitable combination of the various tests discussed above, but preferably all of them. Each test returns an associated $\chi^2$ statistical test result 46(1) through 46(n), respectively, that is indicative of a degree of randomness for the input data. The test results 46(1) through 46(n) are then used to categorize the input data at 48 based on the selected categorization schema 50 which has been chosen.

The data categorization schema block 50 in FIG. 4 contemplates that a variety of approaches may be taken to ultimately categorize the data based on one's particular preferences. Approaches which are described herein include, for example only, using a "majority-rules" approach whereby random input data is categorized as either compressed or encrypted based on which category receives the most indications from the various statistical tests. Another categorization schema contemplates the use of an optimization algorithm, such as a genetic algorithm, for assigning weighting values to the test results in order to categorize the data. The artisan will readily appreciate, however, that these represent only two possible schema which can be derived and that any suitable schema which utilizes $\chi^2$ statistical value(s) is contemplated.

Figure 5:
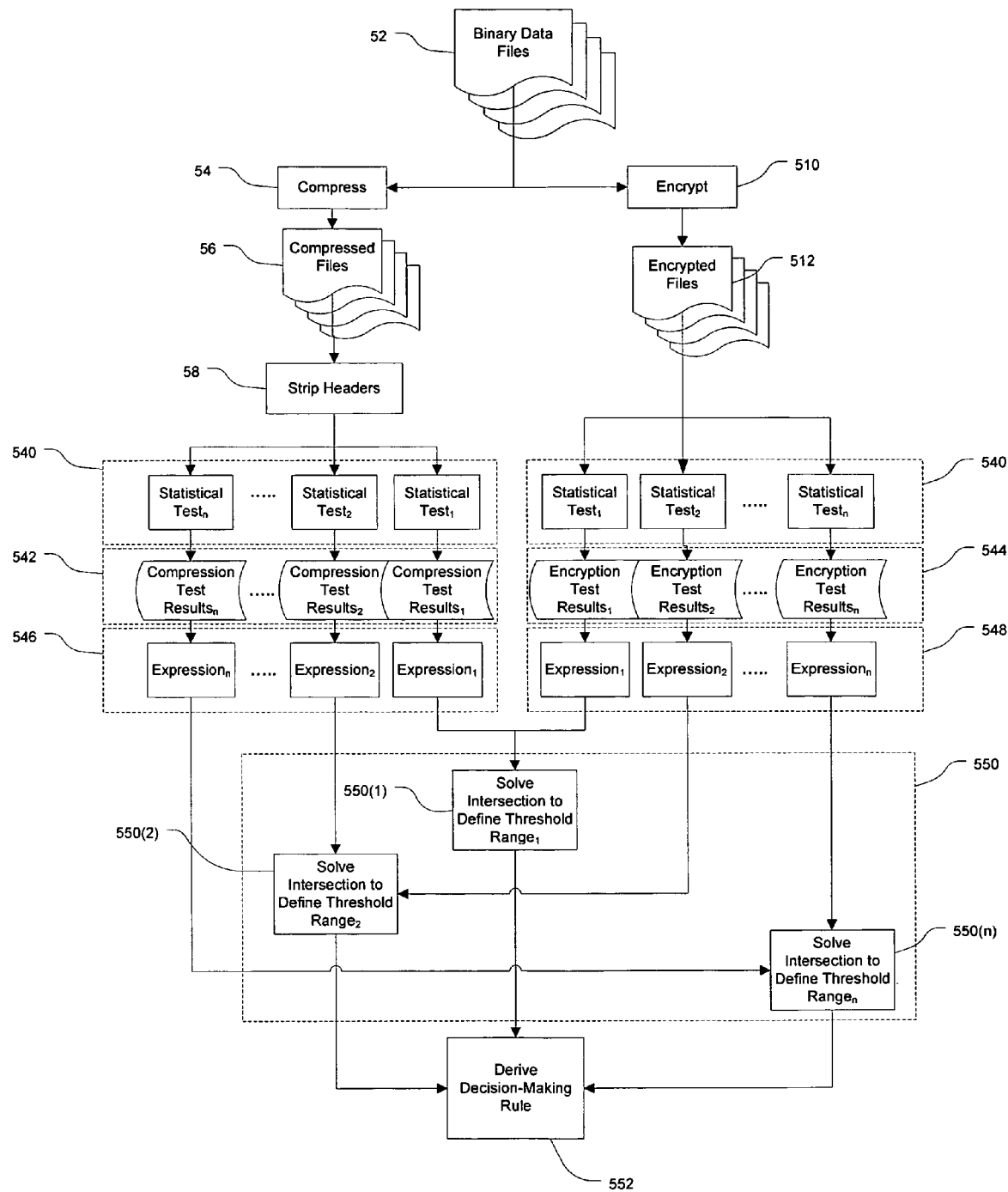
FIG. 5 is a flowchart corresponding to establishment of a categorization schema which relies on a plurality or predetermined thresholds.

With the above in mind, one approach for deriving a categorization schema 50, as generally referred to in FIG. 4, is now explained in more detail with reference to FIG. 5. Various categorization schema (e.g., majority rules) which benefit from the use of one or more $\chi^2$ threshold ranges for ascertaining whether random input data is either compressed or encrypted. Accordingly, FIG. 5 illustrates how threshold ranges can be preliminarily determined based on a known corpus of binary data files 52 before any actual tests are performed to ascertain whether input data of an unknown type is either compressed or encrypted.

Preferably, data files 52 are of known types that are, at least initially, neither compressed nor encrypted. Preferably also, the set of data files should be sufficiently large to represent a corpus of data that might be found on a typical hard drive. Furthermore, the data files themselves will preferably contain a sufficiently large amount of data to permit the above described statistical test be performed properly and enhance detection accuracy. To this end, and for illustrative purposes only, it has been found that the /usr/share directory of a Red Hat Linux 9.0 install contains a usable corpus of files (in excess of 75,000) of various types which can be tested to derive preliminary threshold ranges.

With the above in mind, at least a portion of each file 52 is compressed at 54 to create a set of corresponding compressed files 56. Compression of files may be performed through a variety of readily available sources, for example "gzip", a program that uses the DEFLATE algorithm as described in the P. Deutsch. "DEFLATE Compressed Data Format Specification version 1.3" (RFC 1951), May 1996, which is incorporated by reference. The DEFLATE algorithm defines a lossless compressed data format that compresses data using a combination of the LZ77 algorithm and Huffman coding, with efficiency comparable to the best currently available general-purpose compression methods. Since DEFLATE does a very good job at removing patterns, or compressing, the difference between compression and encryption will be small and more difficult to differentiate. As explained more thoroughly in RFC 1951 the algorithm works by searching through the data using a sliding window to look for repeating patterns of differing sizes. The number of different window sizes used during the compression is determined by the level of compression; there are 9 different levels. Once a pattern, or sub-pattern, has been identified as one that repeats throughout the data, this is recorded as a backward distance and length pair. These pairs, and data that is not found in any pattern, are then encoded using the Huffman encoding algorithm. The backward distance is the distance back into the window the sequence starts. The length is the number of characters in the pattern to repeat.

This can be appreciated with reference to a simplified example taken from http://www.gzip.org/deflate.html.

Assume the following highly compressible data stream:
Blah blah blah blah blah!
The above data stream begins with following characters:
B, I, a, h, , and b
However, the next five characters are:
Blah blah blah blah blah!
There is an exact match for these five characters in the characters that have already gone into the data stream, and this match starts exactly five characters behind the point where we are now. This being the case, the special characters are output to the stream that represent a number for length, and a number for distance.

The data so far is:

Blah blah b

The compressed form of the data becomes: Blah b [D=5, L=5]

Figure 6:
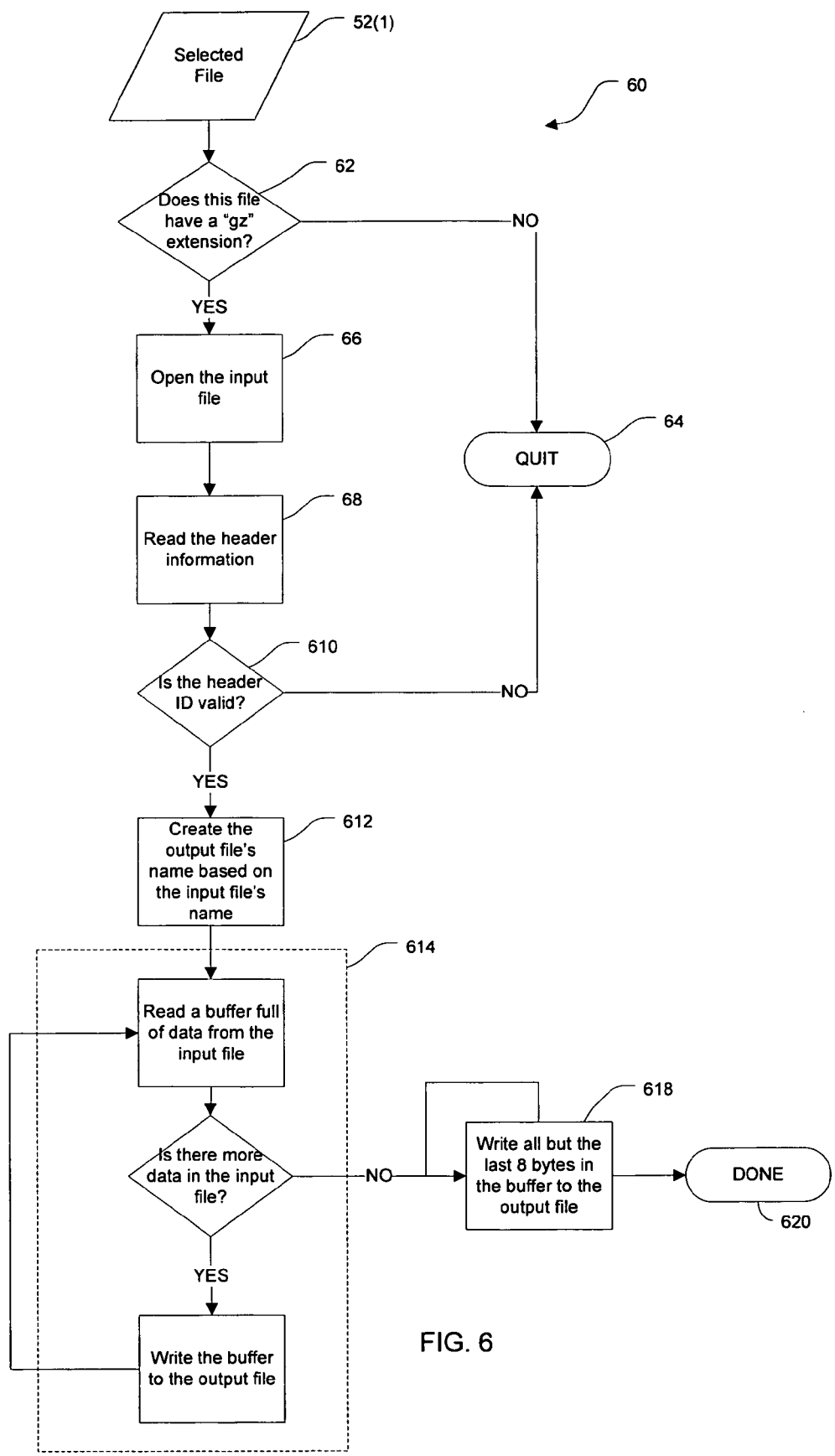
FIG. 6 illustrates a representative routine for removing a file's header portion.

Once the compressed versions of the files are created their headers are stripped at 58 (FIG. 5). FIG. 6 illustrates one possible approach for stripping off the header portion of a data file. For purposes of explanation, it is assumed that the file selected at 52(1) has been previously compressed using the gzip program. Subroutine 60 can be implemented in a number of programming languages, such as through C++. Initially the file extension is checked at 62 to determine if the file is of the correct type—in this case, to determine if it has a "gz" extension. If it is not the correct type, routine terminates at 64. In the case where the file is of the correct type the file is opened at 66 and the header information is read at 68. The header ID is next checked for validity at 610. If the header ID is invalid the routine terminates at 64; otherwise, a new name for the file is generated at 612 based on the original file name. Recursively, the data from the file is next read into a buffer at 614. Finally, the data is written to the output file at 616 except for the last 8 bytes of data, as this corresponds to the header portion. Routine 60 then ends at 620.

Returning to FIG. 5, each of the binary data files 52 is also encrypted at 510 to create a set of corresponding encrypted files 512. Encryption of data is preferably performed using the Advanced Encryption Standard (AES). This standard is described in the National Institute of Standards and Technology. FIPS PUB 197: *Advanced Encryption Standard*. National Institute for Standards and Technology, Gaithersburg, Md., USA, November 2001, which is incorporated by reference. This algorithm was chosen because it is the United States standard for encryption today. Since the algorithm has been highly scrutinized, it should do a very good job in obfuscating the data or removing any patterns that might be found in the data.

There are many different modes that AES can be used in. So as to eliminate patterns altogether the cipher block chaining or CBC mode is preferred. This mode works by XORing the plain text of the next block with the ciphertext of the immediate block. The first block is simply XORed with an initialization vector. Since this algorithm should do a good job of removing any patterns in the data no matter what the key, the following key and initialization vector are used by way of example:

KEY: 13245678901234567890123456789012 and

IV: 21098765432109876543210987654321.

Preferably, salting (as it is known in the art) is not used in the encryption process. The preferred implementation of AES is that of OpenSSL. The reason for using OpenSSL over PGP, for example, is that OpenSSL does not add a header to the output file. Instead, it simply encrypts the data and writes the encrypted data to a file.

With the above in mind, an example command line syntax for generating the encrypted files is as follows:

```
openssl enc -e -nosalt -aes-128-cbc -K
   13245678901234567890123456789012 -iv
   21098765432109876543210987654321 -in
   input_file -out output_file.aes
```

Because the exemplary encryption method described above does not generate a header portion to the data file there is not a need to strip the head of the resulting encrypted file as was necessary in the compression of the binary data files discussed above.

Figure 14:
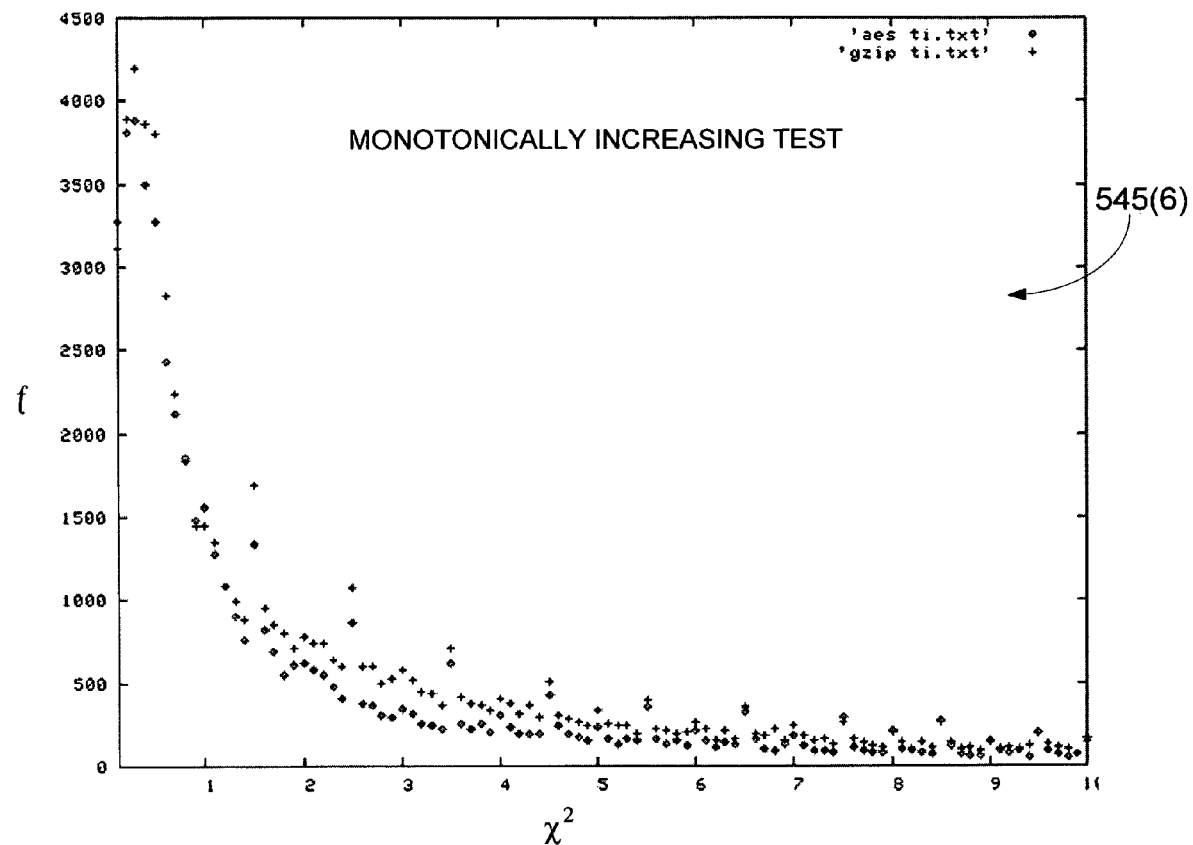
FIGS. 14 & 15, respectively, are data plots showing distributions of $\chi^2$ test results obtained when the monotonically increasing and decreasing tests were conducted against the same set of compressed and encrypted data files.
Figure 15:
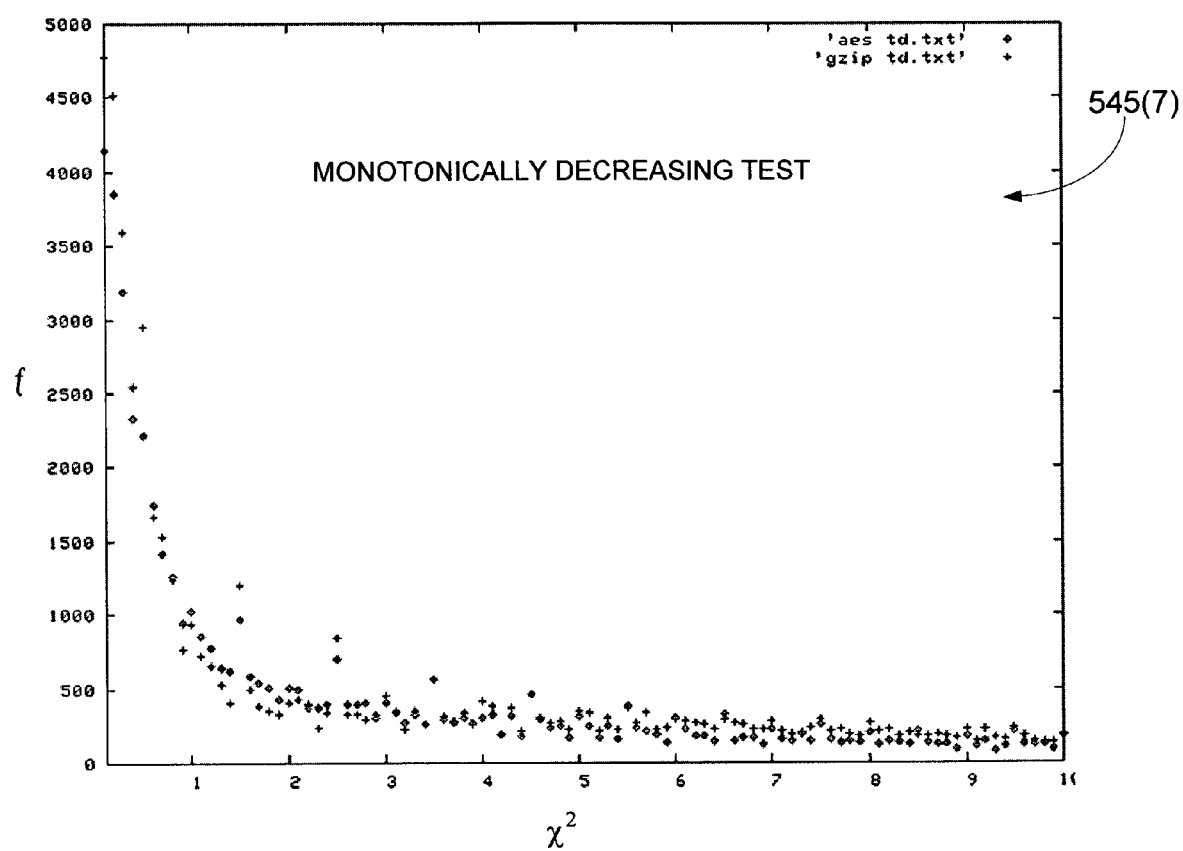

Once the compressed and encrypted versions of files 52 have been created, a plurality of statistical tests are conducted against each file at 540, thereby creating respective distributions of statistical test results for the compressed files 56 and for encrypted files 512. These distributions are generally represented in FIG. 5 as compression test results 542 and encryption test results 544. Once $\chi^2$ value distributions are obtained for each of the tests they can be plotted. FIGS. 9-13, respectively, illustrate data plots of compression and encryption distributions, generally 545(1) through 545(5), that were obtained when the frequency test, the serial test, the poker test, the runs test, and the autocorrelation test were conducted against the representative corpus of files discussed above. Data plot distributions 545(6) and 545(7) for the monotonically increasing and decreasing tests can be found in FIGS. 14 and 15, respectively. In each of these data plots the $\chi^2$ values run along the x-axis and the number of times f that $\chi^2$ values occurred is represented on the y-axis.

Having collected the distributions of $\chi^2$ values 542 and 544 for the various files, threshold values for the each test can be defined. This is accomplished by initially deriving first mathematical expressions 546, each of which conforms to a respective distribution of the compression test results 542, as well as second mathematical expressions 548 conforming to the distributions 544 of the encryption test results.

One method for deriving the mathematical expressions of the distributions is to fit an equation to the data with the aid of a curve fitting software package such as gnuplot. Such software packages will take data points of the form (x,y) and use either interpolation or approximation to derive an equation that fits the given data points. Two common methods of polynomial interpolation are Newton's method and Lagrange interpolation which are described, for example, in Walter Gautschi, "Numerical Analysis: An Introduction", Birkhäuser, Boston, 1997 and Myron B. Allen II and Eli L. Isaacson, "Numerical Analysis for Applied Science", John Wiley & Sons, Inc., 1998, each of which is incorporated by reference. Once the mathematical expressions for the distributions have been derived, associated threshold ranges 550(1) through 550(n) can be defined by solving, with respect to each statistical test, for an intersection of the corresponding first and second mathematical expressions.

To illustrate this, threshold range 550(1) in FIG. 5 would be defined by first deriving a mathematical expression 546(1) corresponding to the distribution of compression test results 542(1). Then, a mathematical expression 548(1) corresponding to the distribution of encryption test results 544(1) is derived. Mathematical expressions 546(1) and 548(1) are then solved for their intersection. The resulting intersection becomes a threshold value, and a threshold range can be defined based on this value. Table 1 below lists exemplary intersection values for the distributions shown in the data plots of FIGS. 9-13 for the various statistical tests.

TABLE 1

| TEST | INTERSECTION |
|---|---|
| Frequency | 2.53250 |
| Serial | 4.33429 |
| Runs | 10.88459 |
| Poker | 8.17413 |
| Autocorrelation | 1.60467 |

So, for example, from Table 1 above it may be seen that the intersection for the frequency test is 2.53250 which, based on one's accuracy preferences, could be rounded to 2.5. This intersection 2.5 is thus the threshold value for the frequency test. From this, a threshold range can be defined to ascertain, with respect to the frequency test, if an actual $\chi^2$ test result is indicative of encryption or compression. More particularly, the $\chi^2$ threshold range for the frequency test could be described as being less than 2.5 such that a given test result is indicative of encryption if it falls within this range, or otherwise indicative of compression if it falls outside of this range (i.e. greater than 2.5). Of course, the artisan will recognize that the precision with which the upper or lower boundary limits of the respective threshold ranges are defined is based on one's particular preferences.

Even still, an intermediate zone of ranges could be defined (again based on one's preferences) wherein test results could be deemed inconclusive. This would be a more conservative approach. Thus, with reference again to the frequency test, one could elect to consider any $\chi^2$ test result between about 2.0 and 3.0 to be indeterminate such that the threshold range for compression would become less than about 2.0 and the threshold range for a determination of encryption would be greater than about 3.0. The clustering of the respective distributions for each test might influence the decision on what the precise threshold range(s) is.

Accordingly, the above intersection values and the precision with which they have been represented in Table 1 are for illustrative purposes only and not for purposes of confining what is meant by either the terms threshold value or threshold range, since one could have a great deal of flexibility in this regard based on a particular set of circumstances (e.g. the corpus of files chosen, the size of the files, the manner in which the mathematical expressions are generated, etc.). Thus, these terms are to be construed as broadly as possible to encompass any of a variety of liberal or conservative approaches for arriving at associated ranges for characterizing data as either encrypted or compressed.

With continued reference to FIG. 5, one or more decision-making rule(s) 552 can then be derived based on the predetermined threshold ranges (generally 550) such that, actual input data that is tested can be categorized, for example, as encrypted if the actual statistical test results satisfy the decision-making rule(s) 552 or compressed if they fail to satisfy the decision-making rule(s), or vice versa. Thus, for example, with the "majority rules" compression scheme a decision-making rule might correspond to a determination that input is encrypted if a majority of the statistical tests produce actual $\chi^2$ test results that fall within associated threshold ranges that are indicative of encryption rather than compression. Alternatively, and without limiting the invention, one might elect to devise decision-making criteria based on an if-then-else approach. With such an approach, for example, one particular test might be deemed determinative if another test indicates encryption. Otherwise, reliance is based on one of the remaining tests. Even still, an "all or nothing" approach could be taken for the decision-making criteria. Thus, box 552 of FIG. 5 is intended to encompass any of a variety of decision-making criteria which one might devise having knowledge of the information conveyed by the results obtained at steps 542,544 in FIG. 5 and their associated expressions derived at 546 and 548. It should further be appreciated that the decision-making rules (if needed) could be represented by mathematical expressions, Boolean expressions, or a combination of both.

Figure 7:
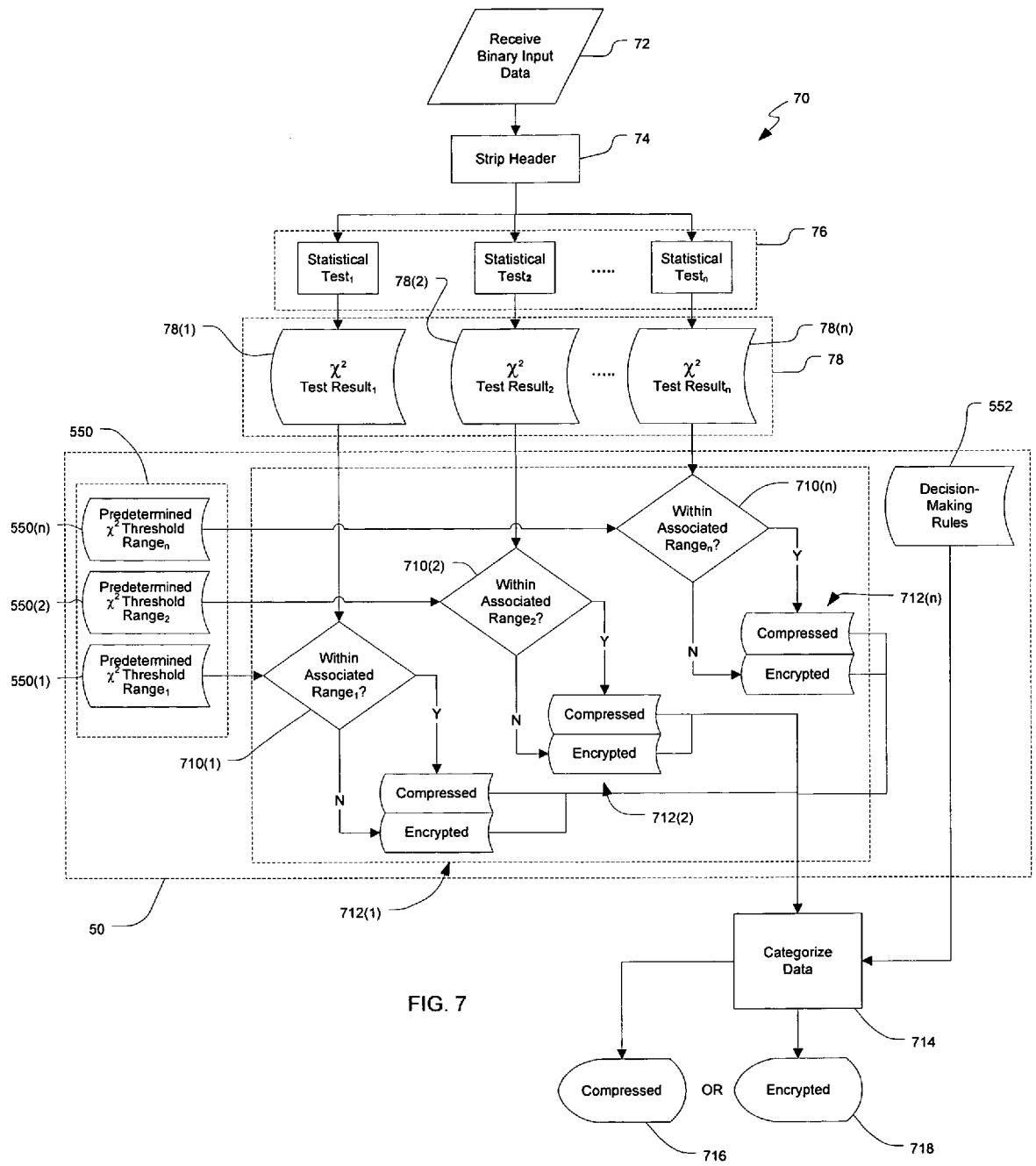
FIG. 7 is a detailed flowchart illustrating one embodiment for categorizing input data as either compressed or encrypted.

With this in mind, once the various threshold ranges have been determined, testing can be conducted against actual data whose type is unknown in order to ascertain whether the data is encrypted or compressed. This may be appreciated with reference to the exemplary data categorization method 70 depicted in FIG. 7. According to method 70, binary input data to be tested is initially received at 72. At this point if the data is from a data file (or perhaps even a contiguous data stream) having a discernible header portion, the header portion is preferably stripped at 74 in order to enhance the accuracy by removing any non-random information that might skew the results. A plurality of statistical tests, generally 76, as described above are performed on the input data resulting in actual $\chi^2$ test results 78(1) through 78(n), respectively. Next, determinations are made whether the actual test results (generally 78) fall with associated threshold ranges. More particularly, a respective determination 710(1) through 710(n) is made for each particular test result 78(1) through 78(n) to ascertain if it falls with the associated threshold range 550(1) through 550(n). Again, based on how the various threshold ranges have been defined, preliminary indications of compression or encryption are then arrived at 712(1) through 712(n). Then, based on the decision-making rule(s) 552, the data is finally categorized at 714 as either encrypted 716 or compressed 720.

Figure 8:
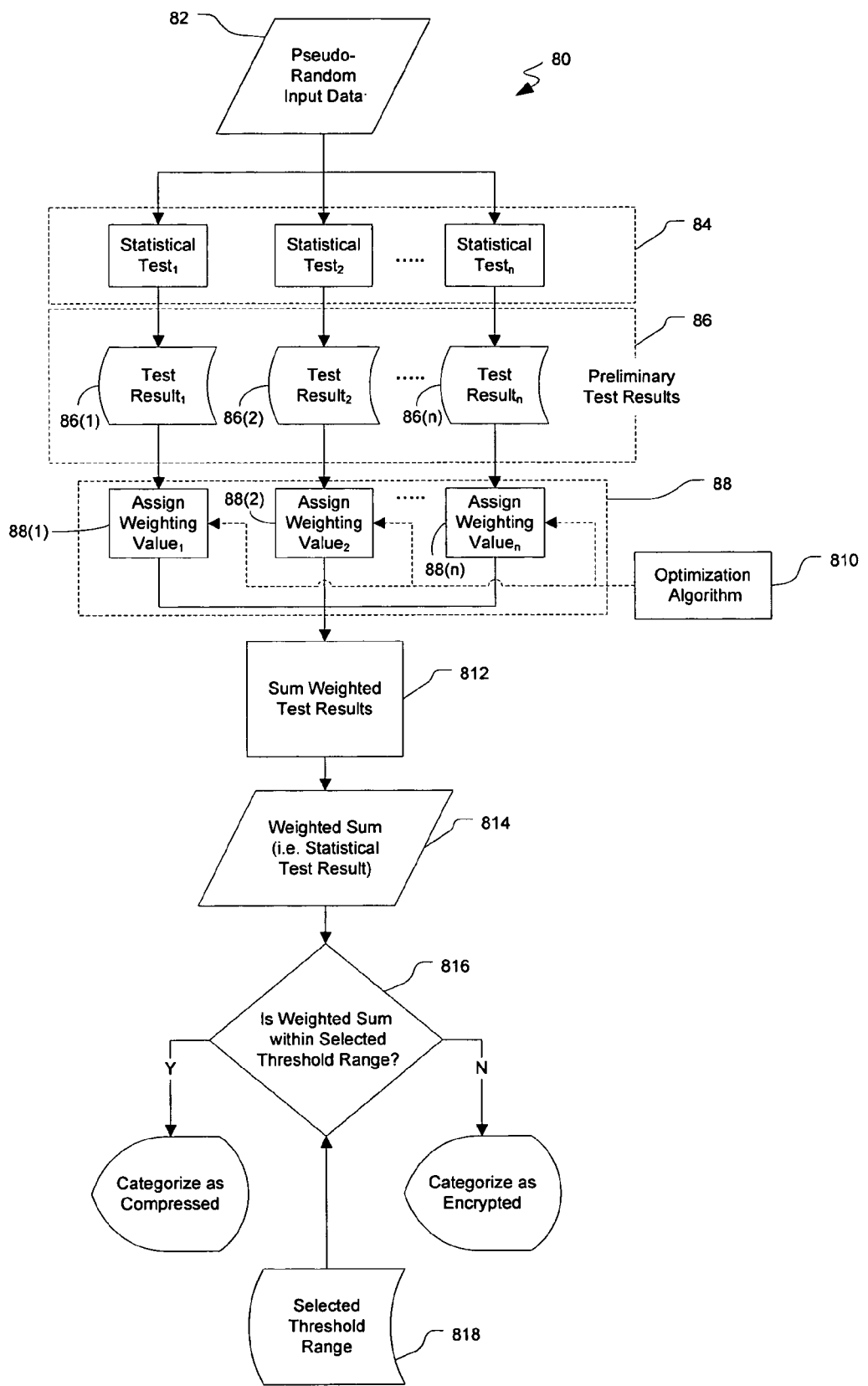
FIG. 8 is a flowchart of another exemplary embodiment of a data categorization method which utilizes an optimization algorithm.
Figure 9:
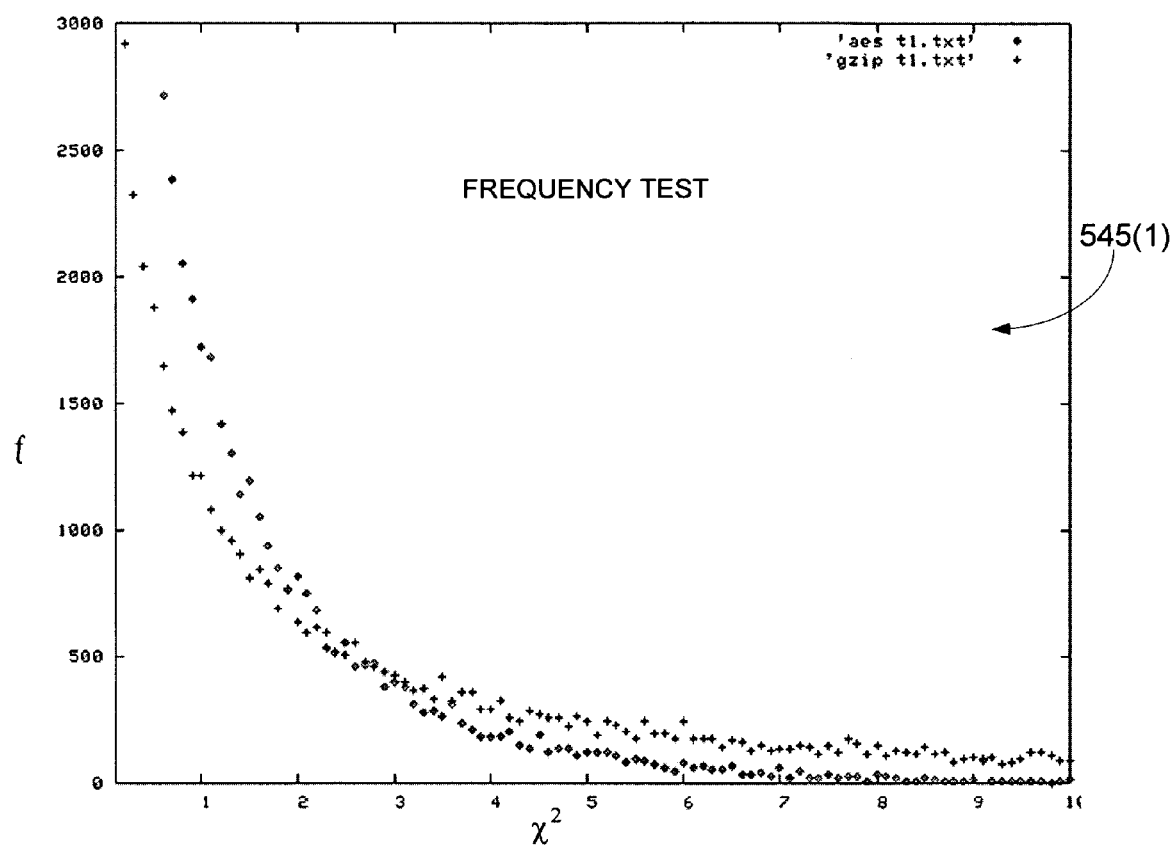
FIGS. 9-13, respectively, are data plots showing distributions of $\chi^2$ test results obtained when the frequency test, the serial test, the poker test, the runs test, and the autocorrelation test were conducted against a set of compressed and encrypted input data files.
Figure 10:
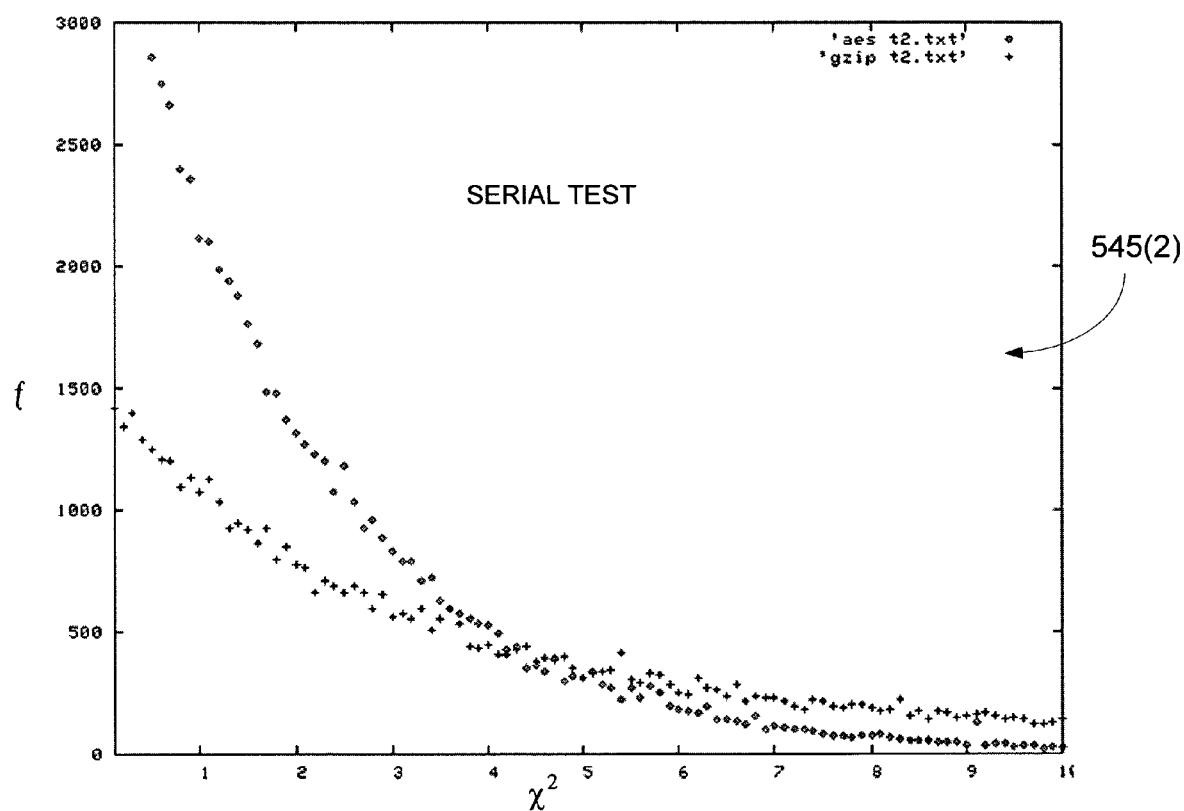
Figure 11:
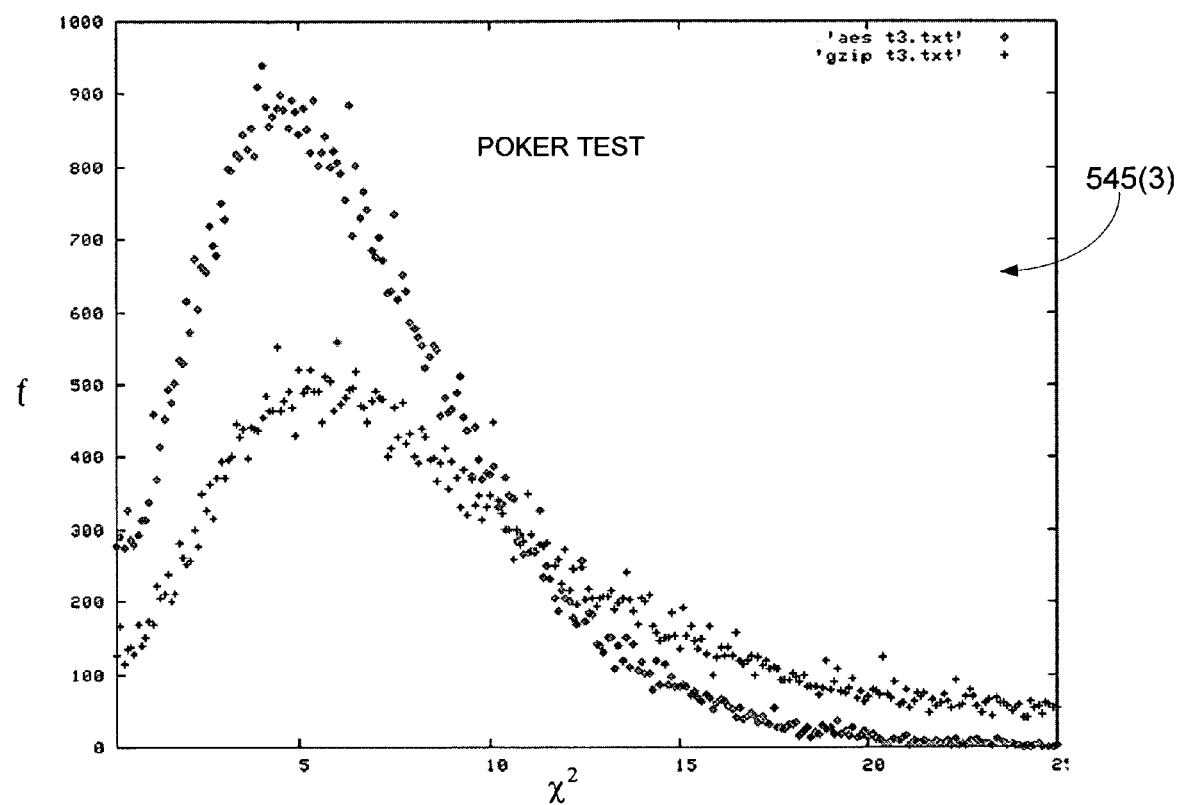
Figure 12:
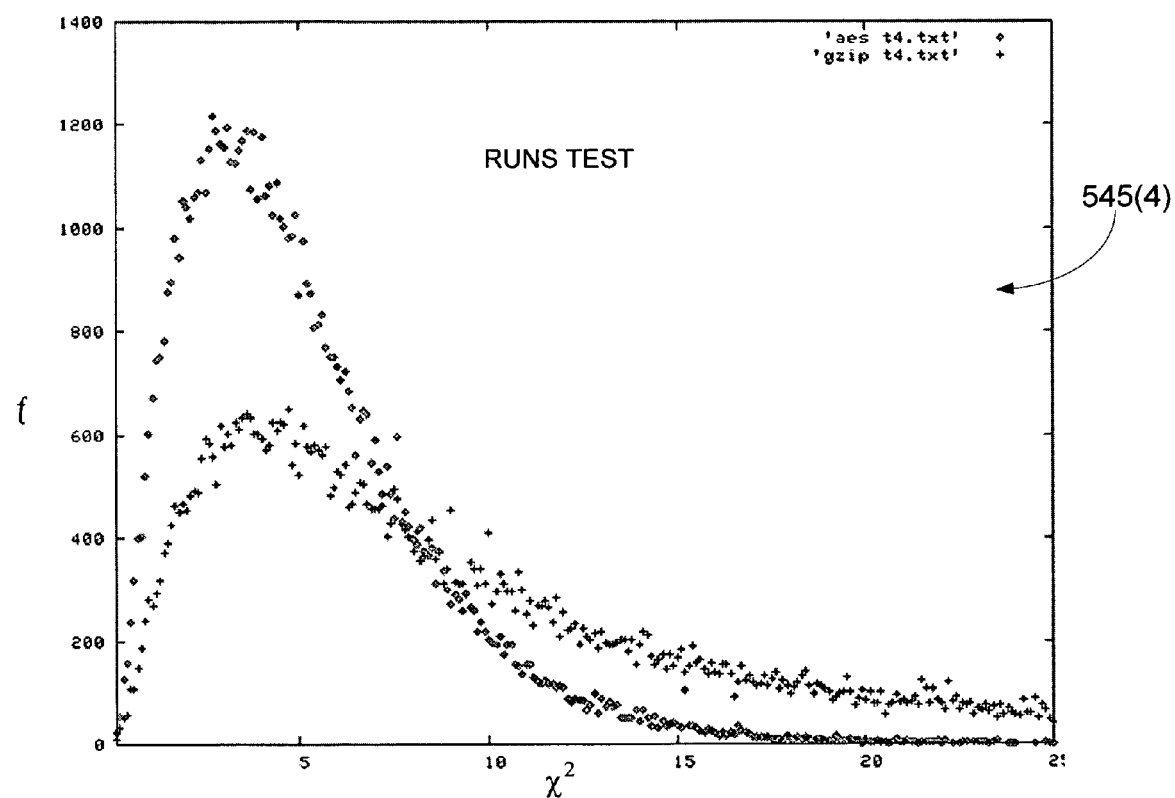
Figure 13:
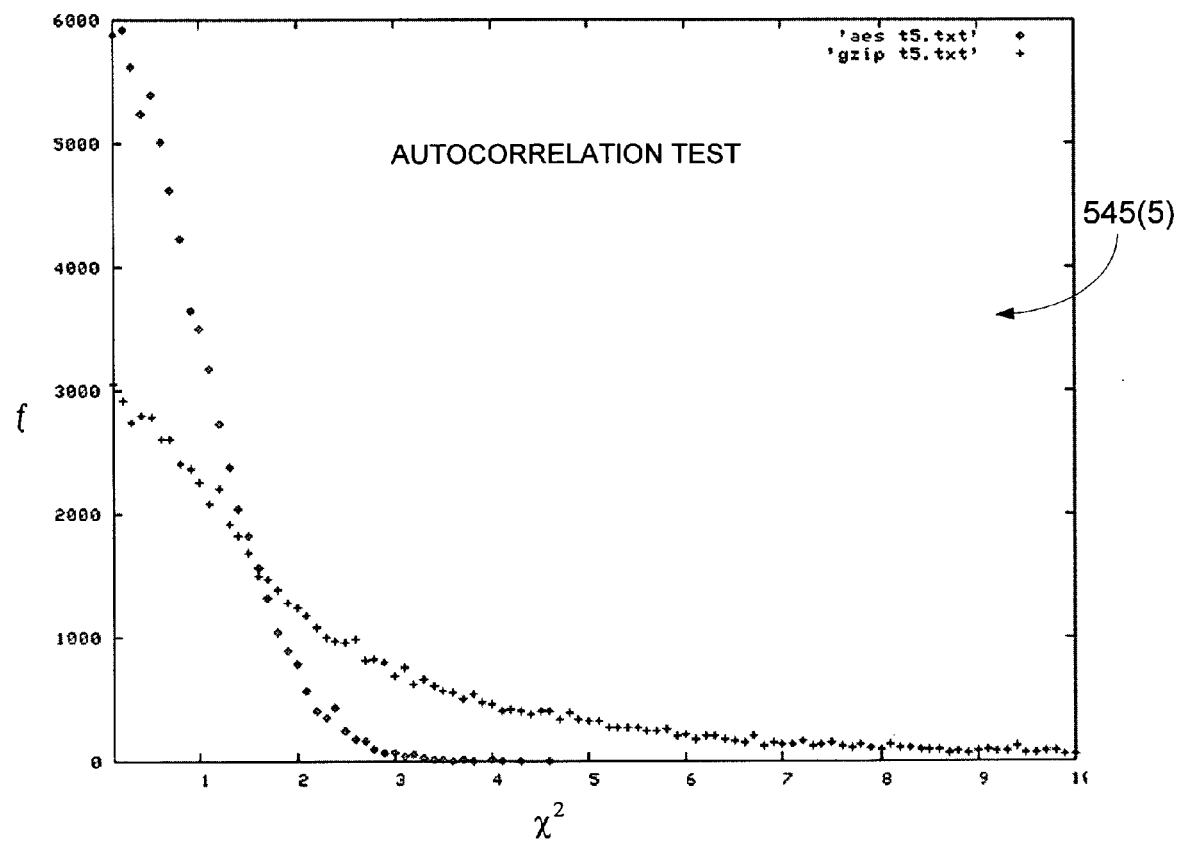

Another exemplary embodiment of the data categorization method 80 is illustrated in FIG. 8. According to method 80, random input data is received 82, at which point a plurality of statistical tests 84 (as described above) are performed on the input data resulting in associated preliminary test results, generally 86. Next, each test result is assigned a respective weighting value 88(1) through 88(n) according to a selected optimization algorithm 810. The weighted test results (generally 88) are next summed at 812 resulting in an overall statistical test result 814.

The summing the weighted test values can be expressed mathematically as follows:

$$av+bw+cx=\text{weighted sum},$$

where v, w, and x represent preliminary test results (86(1) through 86(n), respectively) and a, b, and c represent the assigned weighting values (88(1) through 88(n), respectively). The weighted sum 814 is then tested at 816 to determine if it is within a selected threshold 818 range such that the input data can ultimately be characterized as either encrypted or compressed based on such determination. For example, the threshold range may be defined such that if the weighted sum 814 is negative the input data is categorized as compressed, and if the weighted sum 814 is positive the input data is categorized as encrypted.

It should be understood from the above description that the weighting values (generally 88) should be selected such that the resulting weighted sum 814, when compared to the threshold range, yields accurate results in determining the category of the input data. This can be achieved by taking a large set of known data files and performing this method of categorization on them and selecting weighting values and a threshold value such that the resulting categorization is correct for the vast majority of the known files. This approach capitalizes on patterns that may be present in the data. For example, there might be a pattern in the data that shows that the frequency test works just as often as the serial test, and on the same files; thus, discarding one of these tests would not degrade the overall accuracy of the method. Another pattern might be that when both the runs test and the poker test both indicate a compressed file and the frequency test indicates an encrypted file, the tested file is almost always compressed. Finding these patterns manually or by simple analysis would be tedious, if not impossible. It is therefore desirable to use the optimization algorithm 810 referred to above in order to hone in on the appropriate weighting values 88. Such optimization might suitably be accomplished via a genetic algorithm, fuzzy logic or numerical methods, to name a few possibilities. It has been found that the genetic algorithm SUGAL written by Dr. Andrew Hunter at the University of Sunderland, England can be suitable for such purpose. Also available is a genetic algorithms toolbox for MATLAB, available from The MathWorks, Inc. of Natick, Mass.

Accordingly, the present invention has been described with some degree of particularity directed to the exemplary embodiments of the present invention. While a number of exemplary aspects and embodiments have been discussed, those of skill in the art will recognize certain modifications, permutations, additions and sub-combinations thereof. It is therefore intended that the following appended claims and any claims hereafter introduced be interpreted to include all such modifications, permutations, additions and sub-combinations as are within their true spirit and scope.

What is claimed is:

1. A method of categorizing random input data in a computer system having a processor, an input/output system, and memory, comprising:
   generating a first version and a second version of each file in a set of pre-existing data files stored in memory;
   performing plural first statistical tests on the first and second versions of each file to identify first and second distributions based on statistical results obtained from the first and second versions of the data file, respectively;
   defining threshold ranges for the first and second distributions, using at least one intersection of a first mathematical expression derived from the first distribution and a second mathematical expression derived from the second distribution;
   performing plural second statistical tests on the input data;
   comparing, in the processor, plural second statistical test results to the threshold ranges; and
   categorizing, in memory, said input data as either compressed or encrypted based on said comparison.

2. The method according to claim 1 wherein said input data comprises a series of bits, each of which is analyzed to derive said statistical test result.

3. The method according to claim 1 whereby said second statistical test results produce an $x^2$ value relating to the input data's degree of randomness.

4. The method according to claim 3 whereby the input data is categorized as compressed if said $x^2$ value is within a pre-determined threshold range.

5. The method according to claim 1 wherein said input data comprises a series of bits and whereby said second statistical test results are obtained by conducting statistical tests against the input data that is selected from a group of tests consisting of: a frequency test, a serial (two-bit) test, a poker test, a runs test, an autocorrelation test, Maurer's universal statistical test, a monotonically increasing test, and a monotonically decreasing test.

6. The method according to claim 5 further comprising:
   assigning a weighting value to each second test result to generate a plurality of weighted test results;
   summing the weighted test results to produce a weighted sum which corresponds to said second statistical test results; and
   categorizing the input data as compressed if said weighted sum is within a selected threshold range, or encrypted if said weighted sum is outside of the selected threshold range.

7. The method according to claim 6 whereby each weighting value is determined by an optimization algorithm.

8. The method according to claim 7 wherein said optimization algorithm is a genetic algorithm.

9. The method according to claim 1 wherein said input data is random input data that is one of a data file and a contiguous data stream.

10. The method according to claim 9 wherein the random input data is a data file, which includes a file header and a data portion, and whereby said second statistical results are derived by analyzing only said data portion.

11. A data categorization method for a computer system having a processor, an input/output system, and memory, the method comprising:
    generating a first version and a second version of each file in a set of pre-existing data files stored in memory;
    performing plural first statistical tests on the first and second versions of each file to identify first and second distributions based on statistical results obtained from the first and second versions of the data file, respectively;
    defining threshold ranges for the first and second distributions, using at least one intersection of a first mathematical expression derived from said first distribution and a second mathematical expression derived from said second distribution;
    establishing a data categorization schema that includes the threshold ranges;
    receiving binary input data of an unknown data type through the input/output system;
    conducting a plurality of different statistical tests on the input data in the processor, each of which analyzes one or more distinct characteristics thereof to derive an associated statistical test result which is indicative of a degree of randomness for the input data; and
    comparing, in the processor, the statistical test result to said threshold ranges;
    categorizing, in memory, the input data into a selected data type category based on said comparison.

12. The data categorization method according to claim 11 wherein said input data comprises a series of bits, each of which is analyzed to derive each statistical test result.

13. The data categorization method according to claim 11 whereby said data categorization schema is established by:
    selecting a plurality of data files, each of a known data type;
    compressing at least a portion of each data file to produce a corresponding compressed file;
    encrypting at least a portion of each data file to produce a corresponding encrypted file;
    conducting a plurality of said statistical tests against each compressed file thereby to derive a distribution of compression test results for each statistical test;
    conducting said statistical tests against each encrypted file thereby to derive a distribution of encryption test results for each statistical test;
    deriving a first set of mathematical expressions which conform to the distributions of compression test results;
    deriving a second set of mathematical expressions which conform to the distributions of encryption test results;
    solving, with respect to each statistical test, for an intersection of the corresponding first and second mathematical expressions, thereby defining an associated threshold range within which a given test result is indicative of data compression, and outside of which a given test result is indicative of data encryption; and deriving a decision-making rule based on said threshold ranges such that the binary input data can be categorized as either:
(1) compressed if said statistical test results satisfy said decision-making rule, or
(2) encrypted if said statistical test results fail to satisfy said decision-making rule.

14. The data categorization method according to claim 13 whereby said binary input data is categorized as compressed if a majority of said statistical tests are indicative of data compression, otherwise said binary input data is categorized as encrypted.

15. The data categorization method according to claim 13 wherein each data file includes a file header and a data portion, and whereby only said data portion is compressed and encrypted.

16. The data categorization method according to claim 15 whereby said file header is removed prior to creation of the corresponding compressed file and the corresponding encrypted file.

17. The data categorization method according to claim 11 whereby each of said statistical tests is selected from a group of tests consisting of: a frequency test, a serial (two-bit) test, a poker test, a runs test, an autocorrelation test, Maurer's universal statistical test, a monotonically increasing test, and a monotonically decreasing test.

18. The data categorization method according to claim 11 wherein said binary input data is one of a data file and a contiguous data stream.

19. The data categorization method according to claim 11 whereby the selected data type category is selected from a group of categories consisting of: random data, plaintext data, encrypted data, compressed data and unknown data.

20. The data categorization method according to claim 11 wherein the selected data type category is one of encrypted data and compressed data.

21. A method of categorizing binary input data as either compressed or encrypted in a computer system having a processor, an input/output system, and memory, the method comprising:
predetermining, in the processor, an associated $x^2$ threshold range for each of a plurality of statistical tests which may be employed to analyze test data, such that, for each statistical test a given $x^2$ test result is:
(1) indicative of data compression if it falls within the test's associated $x^2$ threshold range, or
(2) indicative of data encryption if it falls outside the associated $x^2$ threshold range; and
pre-establishing, in the processor, a schema for categorizing test data as either compressed or encrypted based on said threshold ranges and on statistical test results to be obtained when conducted against test data;
receiving input data for testing, through the input/output system, wherein said input data is one of:
(1) a data file; and
(2) a contiguous data stream;
conducting, in the processor, each said statistical test on an associated portion of the input data to derive a set of actual $x^2$ test results; and
categorizing, in the memory, said input data as either compressed or encrypted based on whether said actual $x^2$ test results satisfy or fail to satisfy said schema.

22. The method according to claim 21 whereby each statistical test is selected from a group of tests consisting of: a frequency test, a serial (two-bit) test, a poker test, a runs test, an autocorrelation test, Maurer's universal statistical test, a monotonically increasing test, and a monotonically decreasing test.

23. The method according to claim 22 whereby said input data is categorized as compressed if a majority of the actual $x^2$ test results are indicative of data compression, otherwise said binary input data is categorized as encrypted.

24. The method according to claim 21 whereby said input data is categorized as compressed if a majority of the actual $x^2$ test results are indicative of data compression, otherwise said binary input data is categorized as encrypted.

25. The method according to claim 21 whereby said $x^2$ threshold ranges are predetermined by:
selecting a plurality of data files, each of a known data type;
compressing at least a portion of each data file to produce a corresponding compressed file;
encrypting at least a portion of each data file to produce a corresponding encrypted file;
conducting a plurality of said statistical tests against each compressed file thereby to derive a distribution of compression test results for each statistical test;
conducting said statistical tests against each encrypted file thereby to derive a distribution of encryption test results for each statistical test;
deriving a first set of mathematical expressions which conform to the distributions of compression test results;
deriving a second set of mathematical expressions which conform to the distributions of encryption test results; and
solving, with respect to each statistical test, for an intersection of the corresponding first and second mathematical expressions, thereby defining an associated $x^2$ threshold range within which a given test result is indicative of data compression, and outside of which a given test result is indicative of data encryption.

* * * * *